(12) United States Patent
Storm et al.

(10) Patent No.: US 9,327,823 B2
(45) Date of Patent: May 3, 2016

(54) DEVICE FOR REDUCING STRUCTURAL VIBRATIONS OF AIRFOILS

(75) Inventors: Stefan Storm, Unterschleissheim (DE); Rudolf Maier, Miesbach (DE); Andreas Wildschek, Riemerling (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 123 days.

(21) Appl. No.: 14/124,961

(22) PCT Filed: May 25, 2012

(86) PCT No.: PCT/DE2012/000545
§ 371 (c)(1),
(2), (4) Date: Jan. 31, 2014

(87) PCT Pub. No.: WO2012/167769
PCT Pub. Date: Dec. 13, 2012

(65) Prior Publication Data
US 2014/0341737 A1    Nov. 20, 2014

(30) Foreign Application Priority Data

Jun. 10, 2011 (DE) .......................... 10 2011 106 127

(51) Int. Cl.
| | |
|---|---|
| *B64C 5/08* | (2006.01) |
| *B64C 9/00* | (2006.01) |
| *F16F 7/10* | (2006.01) |
| *B64C 27/00* | (2006.01) |
| *B64D 45/00* | (2006.01) |

(52) U.S. Cl.
CPC ... *B64C 9/00* (2013.01); *B64C 5/08* (2013.01); *F16F 7/1011* (2013.01); *B64C 2027/004* (2013.01); *B64D 2045/0085* (2013.01)

(58) Field of Classification Search
CPC .. F16F 7/1017; B64D 2045/0085; B64C 5/08
See application file for complete search history.

(56) References Cited

U.S. PATENT DOCUMENTS

| | | | | |
|---|---|---|---|---|
| 2,361,071 | A * | 10/1944 | Vang ............................. | 188/382 |
| 5,845,236 | A * | 12/1998 | Jolly et al. .................... | 702/195 |
| 2002/0066831 | A1 | 6/2002 | Ngo et al. | |
| 2003/0173725 | A1 | 9/2003 | Noe | |
| 2005/0093302 | A1 | 5/2005 | Miyazaki et al. | |
| 2006/0255206 | A1 | 11/2006 | Jolly et al. | |
| 2010/0021303 | A1 * | 1/2010 | Nielsen et al. ................ | 416/145 |

FOREIGN PATENT DOCUMENTS

| | | |
|---|---|---|
| DE | 3935893 A1 | 5/1991 |
| FR | 2825769 A1 | 12/2002 |
| WO | WO 03/065142 A1 | 8/2003 |

OTHER PUBLICATIONS

International Search Report issued in PCT/DE2012/000545 on Oct. 12, 2012.
International Preliminary Report on Patentability issued in PCT/DE2012/00545 on Dec. 10, 2013.

* cited by examiner

*Primary Examiner* — Brian M O'Hara
(74) *Attorney, Agent, or Firm* — Hoffmann & Baron, LLP

(57) ABSTRACT

A device for reducing structural vibrations of airfoils in an aircraft comprises, in the region of the airfoil tips, at least one force generator acting substantially in the direction of movement of the vibrations. This arrangement has the advantage that such a force generator is considerably less susceptible to wear than conventional aerodynamic flaps and therefore effective vibration damping is possible with a reduced outlay on maintenance and greater efficiency.

13 Claims, 2 Drawing Sheets

DEVICE FOR REDUCING STRUCTURAL VIBRATIONS OF AIRFOILS

CROSS REFERECNCE TO RELATED APPLICATIONS

This application is a U.S. National Phase of International Application No. PCT/DE2012/000545 filed 25 May 2012, which claims benefit of German Patent Application No. 10 2011 106 127.8 filed 10 Jun 2011, the contents of which are incorporated herein by reference in their entirety.

BACKGROUND

The invention relates to a device for reducing structural vibrations of airfoils in an aircraft.

Turbulence is a primary factor in activating vibrations in the airfoils of aircraft, which result in producing high dynamic loads and in reducing passenger comfort. Damping or compensating these flexural vibrations of airfoils with the help of aerodynamic flaps is known for example from WO 2007-061641, U.S. Pat. No. 4,479,620, DE 198 41 632 or EP 1 814 006. The fundamental vibration in the airfoils of large passenger and cargo aircraft has a relatively low frequency (approximately 1 Hz) and depends on various circumstances, in particular on the airspeed. Higher airfoil bending modes also affect the comfort of passengers, and the flap strip width is frequently insufficient to dampen higher modes adequately. Extended continuous dynamic operation of the flaps moreover results in the wear of the actorics and therefore in higher maintenance costs. A further disadvantage consists in that the influence flaps have on the vibrations depends on the mach number and on the speed. Against this background, the object of the invention is to produce an effective damping of the structural vibrations in the airfoils without arranging flaps in order to increase the service life of the structure or reduce the structural weight by means of lighter structural design.

SUMMARY

According to the invention, this problem is solved by providing at least one force generator in the region of the airfoil tips acting substantially in the direction of movement of the vibrations. This arrangement has the advantage that such a force generator is considerably less susceptible to wear than conventional aerodynamic flaps and therefore effective vibration damping is possible with a reduced outlay on maintenance and greater efficiency. Force generators are moreover particularly effective at higher frequencies. In this context, the "direction of movement of the vibrations" is understood as being the direction of vibration of the airfoils, which is vertical in traditional wings, but which can deviate in airfoils inclined slightly upwards from the vertical direction.

According to an advantageous development of the invention, each of the force generators are located in the airfoil winglet. These vertically extending surfaces on the end of the airfoils for improving the left/drag ratio constitute a suitable installation space for force generators.

According to an advantageous development of the invention, the natural frequency of the force generators is tuned to a selected vibration frequency of the airfoils, in particular the second symmetrical or antisymmetrical flexural vibration in the wing. This vibration can consequently be dampened passively and/or at the same time be utilized for vibration dampening and for recovering energy. This requires no additional energy supply, since the system operates completely independently.

According to an advantageous development of the invention, the natural frequency of the force generators is tuned to a mean vibration frequency of the frequency range of interest. This achieves not only a passive elimination of the vibrations for the identical excitation frequency, but vibrations can also be eliminated for excitation frequencies (typically ±10%) that vary therefrom by the introduction of force of a suitable amplitude and phase. Although the vibration movement cannot be minimized completely outside this range, a reduction in the vibration movement can also be achieved here, however. Movements having higher harmonics can be realized by superposing force inputs of higher harmonics, however without utilizing the superelevated vibration by the passive system.

Pursuant to an advantageous development of the invention, forces with a suitable amplitude and phase are introduced at different selected frequencies into the wing structure for shimmy damping, in order to affect the critical flutter speed, for example by shifting one or several selected natural frequencies.

According to an advantageous development of the invention, each force generator is designed as a vertically aligned linear motor with a movable primary or secondary component. This facilitates the force generated to be designed economically in terms of structural aspects, wherein depending on the usefulness, the primary or secondary component can be designed movable, i.e. as a rotor. In this way, necessary components of the force generator can at the same time be used as a vibrating mass, to keep the overall weight of the system as low as possible.

The force generator will preferably comprise a magnetic or a magnetizable rotor, which can oscillate vertically by means of at least one stationary supported spring device as well as a guide, and which is surrounded by a stator coil. This design is particularly easy in terms of structural aspects and can be realized in any vertical length.

In this context, the rotor is preferably supported stationary on both ends by one double beam spring each. This design facilitates a spring suspension and guide of the rotor while keeping structural costs low at the same time.

The rotor will preferably have a movement stroke of 20 to 60 cm. In this range, a relatively low stator mass can be used for damping the typical vibration frequencies in the range of approximately 1-6 Hz.

The rotor will preferably have a mass of 5 to 20 kg. In this range, a suitable oscillation stroke for positioning in a winglet can be used for damping the typical vibration frequencies in the range of approximately 1-6 Hz.

According to an advantageous development of the invention, the force generator can also be controlled as an electric generator, that is for the generation of electrical energy while at the same time damping the structural vibrations in the natural frequency range.

According to an advantageous development of the invention, two or more force generators with different natural frequencies are provided for each winglet. In this way, different vibration modes can be damped optimally or a force generator that is tuned to the fundamental vibration can operate as an electric generator, and the higher vibration modes will be handled by the one or the multiple force generators. The individual force generators can moreover be produced smaller structurally.

According to an advantageous development of the invention, the force generators comprise moving masses in the form of movable fluids. This design facilitates the installation in airfoils without winglets and dispenses with the otherwise necessary installation of extra weights as a necessary component of the force generators. Rather, the existing masses in the form of tanks, such as fuel tanks, are used for this purpose.

According to an advantageous development of this design, the fuel tanks can be placed into oscillating motion. This means that practically no additional mass has to be provided in the external areas of the airfoils.

Pursuant to an alternative advantageous development of this design, in each case at least two volume elements in which the volume can be changed are positioned in the inside of the fuel tanks, which are located on the top or on the bottom in the fuel tank and which comprise variable oscillating volumes which are reciprocally offset by 180°. This design has the advantage that no moving components exist which have to be supported and/or guided, except for the bellows. By selecting the elastic properties of the bellows, and the selection of the system which permits inflating the bellows oscillating, the resonance frequency of the bellows system is tuned to the natural frequency of the wing vibration to be controlled. By utilizing the resonance step-up of the bellows system this minimizes the energy effort for inflating and deflating the bellows.

According to an advantageous development of this design, the resonance frequency of the volumetrically variable volume elements are tuned to the natural frequency of the wing vibration to be controlled. By utilizing the resonance step-up of the bellows system, the energy effort for inflating and deflating the bellows is minimized.

According to an advantageous development of the invention, a closed hollow body can be moved oscillating in the fuel tank and as a result of which the fluid is displaced and a shift in the center of gravity of the fluid is attained.

SUMMARY OF THE DRAWINGS

The invention is subsequently explained in detail by means of a preferred embodiment with reference to the drawings, as follows.

DETAILED DESCRIPTION

Figure 1:
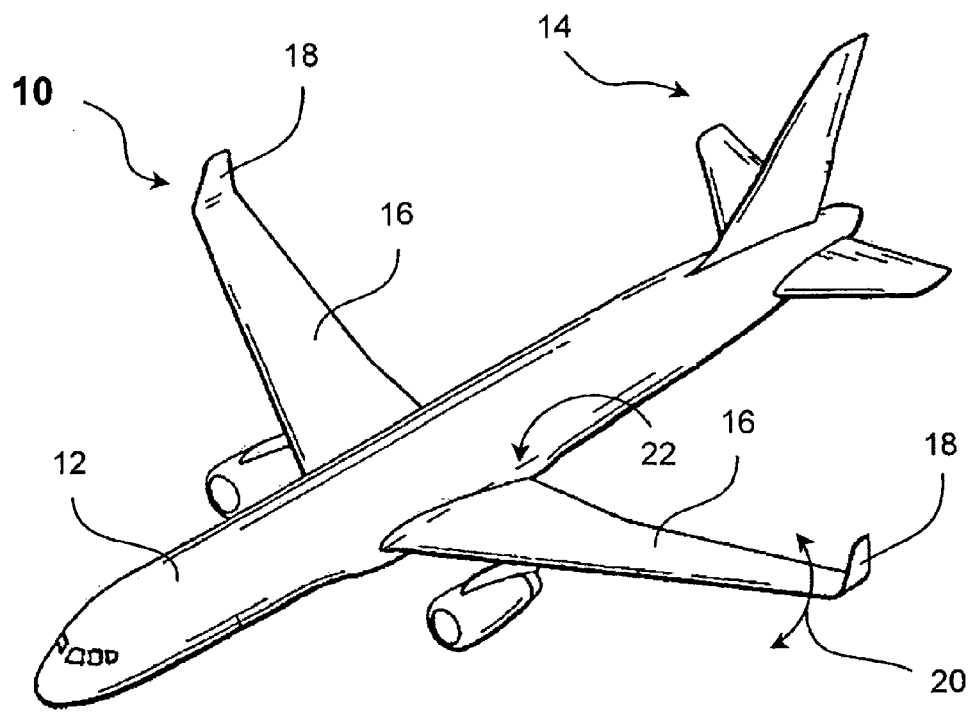
FIG. 1: is a schematic perspective representation of an aircraft with winglets.

FIG. 1 illustrates an aircraft 10 with fuselage 12, tail assembly 14 and two airfoils 16, at the ends of which one essentially vertically aligned winglet 18 is arranged in each case. During normal flight operations, but especially during turbulences, the airfoils 16 tend to vibrate in the directions designated as 20 about the axis of vibration 22 positioned in the fuselage 12 in the area where the airfoils 16 are attached.

Figure 2:
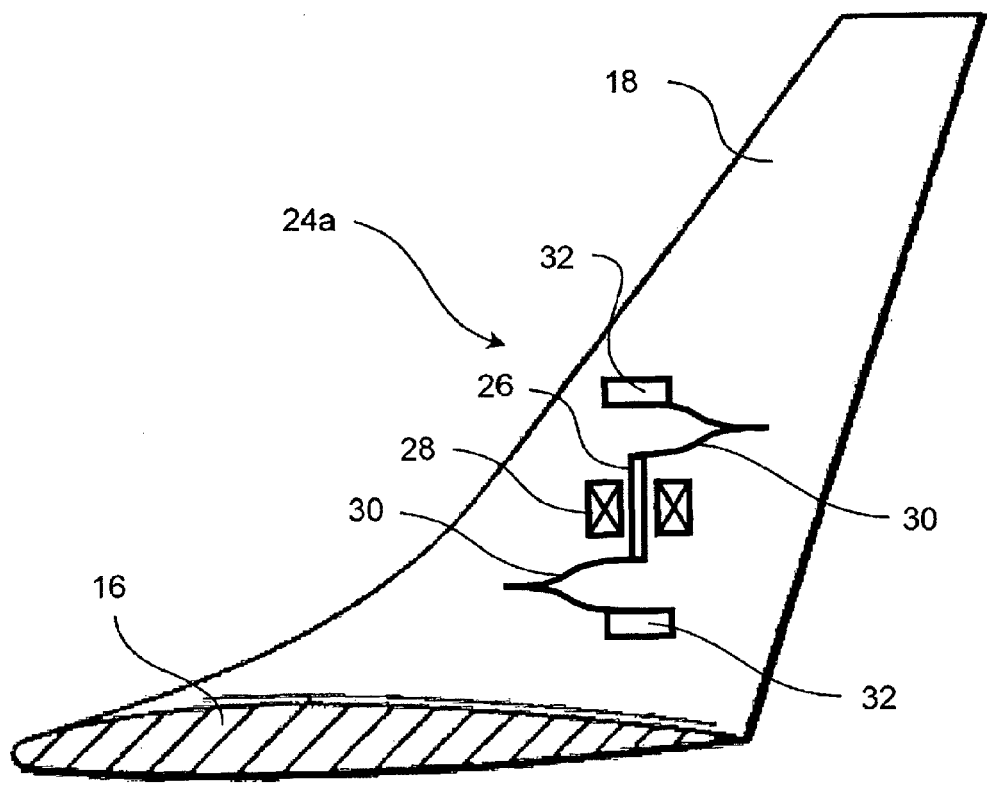
FIG. 2: is a lateral view with a schematically illustrated force generator.

FIG. 2 is a schematic lateral view of a winglet 18, in which the force generator 24*a* is located. This force generator 24*a* essentially consists of a rotor 26 surrounded by a coil 28. Double beam springs 30 are attached on both ends of the rotor 26, the other ends of which are rigidly fixed to mounting abutments 32, which in turn are supported on structural components of the winglet 18. In this manner, a motor without bearings can be realized, wherein the mounting abutments 32 serve both as an abutment for the rotor 26 as well as for the guide suspension arrangement for the entire force generator 24*a*. Using the two double beam springs 30 achieves that the rotor 26 is guided linear. The movement of the rotor 26 can be started or stopped by means of the coil 28. Alternatively, it becomes possible to draw off induced current for energy recovery by the passive utilization of the moving field. The rotor 26 can either comprise a permanent magnet, which at the same time represents the moving mass, or be designed as an electromagnet with an electrically wired coil.

A preferred embodiment of the force generator 24*a* according to the invention has a rotor 26 with a 10 kg mass. With an excitation of 4000 N and a vibration frequency of approximately 4.2 Hz, the rotor 26 can be deflected by approximately 56 cm. For this purpose, a frequency range of approximately +/−10% can be dampened entirely with relatively low additional forces of approximately 700 N.

During operation, the vibration of the airfoils 16 can be recorded by sensors (not illustrated) and supplied to a controller, which feeds the coil 28 by means of an electrical amplifier and controls it such that the reduction in vibrations is maximal. Since electrical current is generated phase shifted by the oscillating movement of the rotor 26 in the field of the coil 28, the energy consumption of the force generator 24*a* is essentially limited to the electrical and mechanical losses and therefore represents only an insignificant load for the aircraft electrical system. If the airspeed of the aircraft 10 is changed or the turbulence situation and thus the vibration frequency of the airfoil vibrations, this can be allowed for by the appropriate control of the rotors 26.

Figure 3:
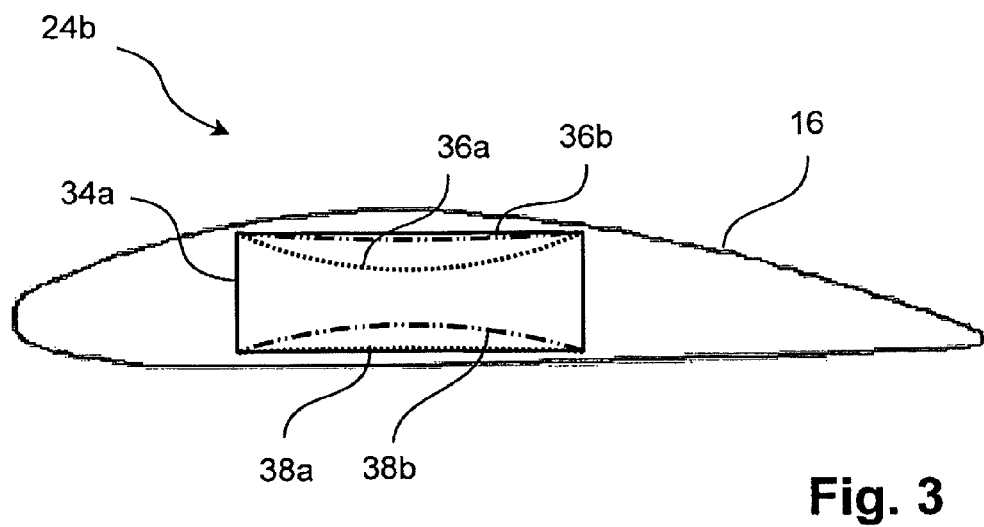
FIG. 3: is a schematic cross-sectional view of an airfoil with a fuel tank with bellows.

FIG. 3 is a schematic cross-sectional view through an airfoil 16 in the area of the airfoil tip with an additional design of a force generator 24*b*. Represented schematically, a fuel tank 34*a* remains continuously filled with fuel, which is only consumed in exceptional or emergency situations. Its content, the fuel or the filled fuel tank 34*a* themselves, can be used for the force generator. In the embodiment illustrated in FIG. 3, two bellows 36, 38 are arranged at the top and at the bottom inside of the fuel tank 34*a*, where said bellows can be alternatively filled by compressed air lines (not illustrated). In each case, the reference symbol (a), i.e. 36*a*, 38*a*, represents a first position, in which the upper bellows 36*a* is full and the lower bellows 38*a* is empty, so that the center of gravity of the fluid within the fuel tank 34*a* lies below the geometric center of the fuel tank 34*a*. In each case, the reference symbol (b), i.e. 36*a*, 38*a*, represents a second position, in which the upper bellows 36*a* is empty and the lower bellows 38*a* is full, so that the center of gravity of the fluid within the fuel tank 34*a* lies above the geometric center of the fuel tank 34*a*. Between these two end positions, an oscillation event occurs, which permits the fluid in the fuel tank 34*a* to oscillate vertically and forms a force generator 24*b* in this manner.

Figure 4:
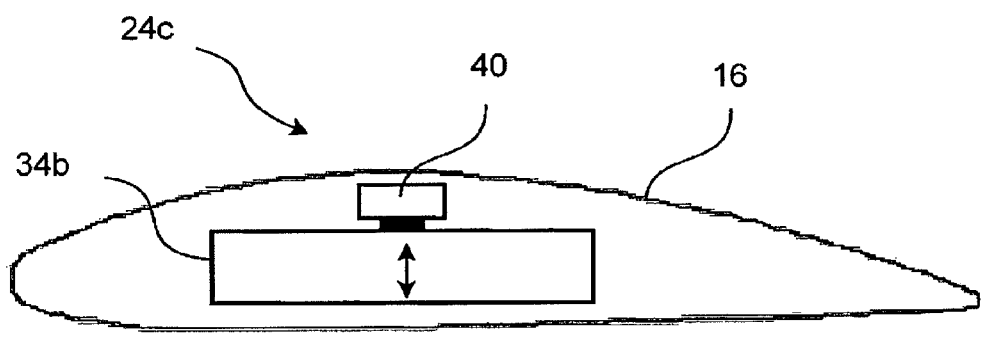
FIG. 4: is a schematic cross-sectional view of an airfoil with an oscillatable fuel tank.

FIG. 4, same as FIG. 3, is a schematic cross-sectional view of an airfoil 16 in the area of the airfoil tip with a fuel tank 34*b* for fuel, which can be moved oscillatory by means of an oscillation unit 40 in a direction perpendicular to the longitudinal axis of the airfoil and in this manner forms the force generator 24*c*.

Figure 5:
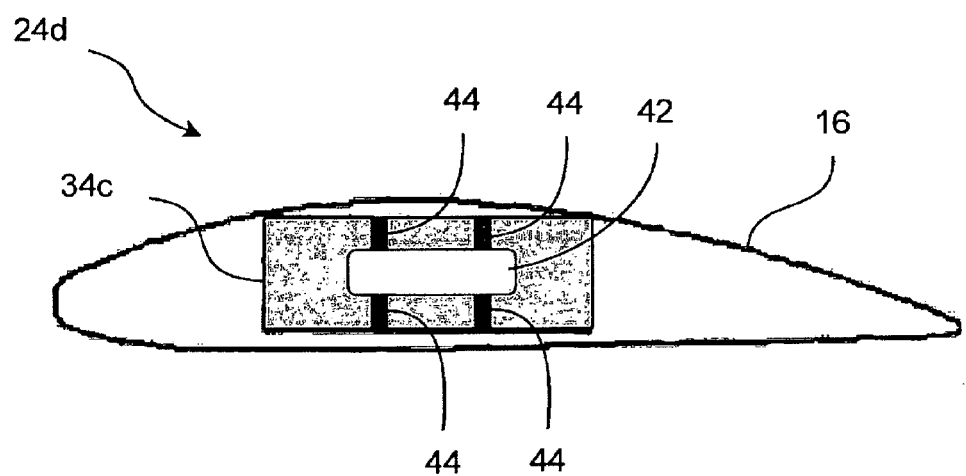
FIG. 5: is a schematic cross-sectional view of an airfoil with an oscillatable fuel tank with a movable hollow body.

FIG. 5, same as FIGS. 3 and 4, is a schematic cross-sectional view of an airfoil 16 in the area of the airfoil tip with a fuel tank 34*c* for fuel with a further design of a force generator 24*d*. The fuel tank 34*c* itself is fixed, but in the inside contains a fluid-free hollow body 42, which can be moved oscillatory (electromechanically, pneumatically or hydraulically) by means of a number of actuators 44. As a result, the fuel is displaced, which produces a shift in the center of gravity of the fluid

LIST OF REFERENCE SYMBOLS

10 Aircraft
12 Fuselage

14 Tail assembly
16 Airfoil
18 Winglet
20 Direction of vibration
22 Axis of vibration
24a-d Force generator
26 Rotor
28 Coil
30 Double beam springs
32 Mounting abutment
34a,b Fuel tank
36a, b Bellows
38a, b Bellows
40 Oscillation unit
42 Hollow body
44 Actuators

The invention claimed is:

1. A device to reduce structural vibrations of airfoils in an aircraft, the device comprising:
at least one force generator arranged in winglets provided on ends of the airfoils, the at least one force generator acting substantially in a direction of movement of the vibrations;
wherein fluid from fuel tanks arranged in an area of airfoil tips is moveable in an oscillatory manner as a vibrating mass of the at least one force generator.

2. The device according to claim 1, wherein a natural frequency of the at least one force generator is tuned to a first or to a second symmetrical or antisymmetrical flexural vibration in each of the airfoils.

3. The device according to claim 1, wherein a natural frequency of the at least one force generator is tuned to a mean vibration frequency of a relevant frequency range.

4. The device according to claim 1, wherein the at least one force generator is designed as a vertically aligned linear motor with a movable primary or secondary part.

5. The device according to claim 4, wherein the force generator comprises a magnetic or a magnetizable rotor that is enabled to oscillate vertically using at least one stationary supported spring device and a guide surrounded by a stator coil.

6. The device according to claim 4, wherein the force generator comprises an oscillatable coil and a magnetizable stator.

7. The device according to claim 5, wherein the rotor is supported on both ends by a double beam spring.

8. The device according to claim 1, wherein the force generator is controllable as an electric generator.

9. The device according to claim 1, wherein two or more force generators with different natural frequencies are provided in each winglet.

10. The device according to claim 1, wherein the fuel tanks are capable of being placed into oscillating motion.

11. The device according to claim 1, wherein at least two volumetrically variable volume elements are positioned inside the fuel tanks and on one of top and bottom of the fuel tanks, the volumetrically variable volume elements comprise variable oscillating volumes which are reciprocally offset by 180°.

12. The device according to claim 11, wherein a resonance frequency of the volumetrically variable volume elements is tuned to a natural frequency of a structural vibration to be controlled.

13. The device according to claim 1, wherein a closed fluid-free hollow body is moveable in an oscillatory manner in a fuel tank.

* * * * *